(12) United States Patent
Wagle et al.

US011535785B2

(10) Patent No.: US 11,535,785 B2
(45) Date of Patent: Dec. 27, 2022

(54) DRILLING FLUIDS THAT INCLUDE WATER-SOLUBLE ACID CATALYST PRECURSORS OR REACTION PRODUCTS OF SUCH AND USES FOR SUCH DRILLING FLUIDS

(71) Applicant: Saudi Arabian Oil Company, Dhahran (SA)

(72) Inventors: Vikrant Wagle, Dhahran (SA); Abdullah Al-Yami, Dhahran (SA); Nasser Alalhareth, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/449,959

(22) Filed: Jun. 24, 2019

(65) Prior Publication Data

US 2020/0399522 A1   Dec. 24, 2020

(51) Int. Cl.

| C09K 8/24 | (2006.01) |
| C09K 8/34 | (2006.01) |
| C09K 8/502 | (2006.01) |
| C09K 8/508 | (2006.01) |
| E21B 21/00 | (2006.01) |
| C09K 8/04 | (2006.01) |
| C09K 8/487 | (2006.01) |

(52) U.S. Cl.
CPC ............... *C09K 8/24* (2013.01); *C09K 8/04* (2013.01); *C09K 8/34* (2013.01); *C09K 8/487* (2013.01); *C09K 8/502* (2013.01); *C09K 8/5086* (2013.01); *E21B 21/003* (2013.01)

(58) Field of Classification Search
CPC . C09K 8/03; C09K 8/035; C09K 8/04; C09K 8/426; C09K 8/487; C09K 8/24; E21B 21/003
See application file for complete search history.

(56) References Cited

U.S. PATENT DOCUMENTS

| 2,562,867 | A |   | 7/1951 | Kurtz, Jr. et al. |
| 2,570,892 | A |   | 10/1951 | White |
| 3,816,148 | A |   | 6/1974 | Barthel |
| 4,094,847 | A | * | 6/1978 | Huffman .................. C08L 61/28 428/425.1 |
| 4,772,641 | A |   | 9/1988 | Meltz et al. |
| 4,961,795 | A | * | 10/1990 | Detlefsen ................ B29B 7/325 156/62.2 |
| 4,964,465 | A |   | 10/1990 | Surles |
| 5,061,387 | A | * | 10/1991 | Victorius ............... C09K 8/512 166/270 |
| 5,094,762 | A |   | 3/1992 | Lahalih |
| 5,617,920 | A |   | 4/1997 | Dovan et al. |
| 6,508,306 | B1 |   | 1/2003 | Reddy et al. |
| 7,341,106 | B2 |   | 3/2008 | Reddy et al. |
| 9,045,965 | B2 |   | 6/2015 | Patil et al. |
| 9,133,386 | B2 |   | 9/2015 | Kumar et al. |
| 9,410,066 | B2 |   | 8/2016 | Ghassemzadeh |
| 10,378,299 | B2 |   | 8/2019 | Sabins et al. |
| 2003/0092582 | A1 |   | 5/2003 | Reddy et al. |
| 2003/0132908 | A1 | * | 7/2003 | Herb ...................... G09G 3/344 345/107 |
| 2003/0141062 | A1 |   | 7/2003 | Cowan et al. |
| 2003/0230431 | A1 |   | 12/2003 | Reddy et al. |
| 2004/0023815 | A1 | * | 2/2004 | Burts, III ............... C09K 8/512 507/200 |
| 2005/0166803 | A1 |   | 8/2005 | Dillenbeck et al. |
| 2005/0170973 | A1 |   | 8/2005 | Verret |
| 2005/0230112 | A1 |   | 10/2005 | Reddy et al. |
| 2005/0269080 | A1 |   | 12/2005 | Cowan |
| 2005/0284666 | A1 |   | 12/2005 | Cowan |
| 2006/0234871 | A1 |   | 10/2006 | Dalrymple et al. |
| 2012/0298357 | A1 |   | 11/2012 | Ezell et al. |
| 2013/0098622 | A1 |   | 4/2013 | Abad et al. |
| 2016/0032169 | A1 | * | 2/2016 | Chew ...................... C04B 26/04 166/292 |
| 2016/0304764 | A1 |   | 10/2016 | Misra et al. |
| 2017/0218256 | A1 |   | 8/2017 | Parton et al. |
| 2019/0055455 | A1 |   | 2/2019 | Wagle et al. |

FOREIGN PATENT DOCUMENTS

| WO | 2005100739 A1 | 10/2005 |
| WO | 2005121500 A1 | 12/2005 |
| WO | 2006061561 A1 | 6/2006 |

(Continued)

OTHER PUBLICATIONS

Liu et al., "Performance evaluation and application of modified urea-formaldehyde resin water shutoff agent", Journal of Petroleum Exploration and Production Technology, vol. 7, Issue 1, pp. 155-160, Mar. 2017.
International Search Report and Written Opinion dated Mar. 31, 2020 pertaining to Application No. PCT/US2019/060859 filed Nov. 12, 2019, 13 pgs.
Office Action dated Aug. 31, 2020 pertaining to U.S. Appl. No. 16/449,996, filed Jun. 24, 2019, 29 pgs.
International Search Report and Written Opinion dated Jun. 8, 2020 pertaining to International application No. PCT/US2020/019580 filed Feb. 25, 2020, 14 pgs.
Office Action dated Apr. 27, 2021 pertaining to U.S. Appl. No. 16/449,921, filed Jun. 24, 2019, 40 pgs.

(Continued)

*Primary Examiner* — Aiqun Li
(74) *Attorney, Agent, or Firm* — Dinsmore & Shohl LLP

(57) ABSTRACT

In accordance with one or more embodiments of the present disclosure, a drilling fluid may include a base fluid and one or more formaldehyde-based resins. The drilling fluid may further comprise one or more water-soluble acid catalyst precursors or the reaction products of such water-soluble acid catalyst precursors. The base fluid may include an aqueous or non-aqueous solution. The present disclosure also describes sealed subterranean petroleum formations that include such drilling fluids and methods for sealing subterranean wellbores by utilizing such drilling fluids.

10 Claims, No Drawings

(56) References Cited

FOREIGN PATENT DOCUMENTS

| | | |
|---|---|---|
| WO | 2014011143 A1 | 1/2014 |
| WO | 2019036553 A1 | 2/2019 |

OTHER PUBLICATIONS

U.S. Office Action dated Jul. 29, 2021 pertaining to U.S. Appl. No. 16/449,921, filed Jun. 24, 2019, 14 pages.
U.S. Office Action dated Dec. 21, 2021 pertaining to U.S. Appl. No. 16/449,921, filed Jun. 24, 2019, 26 pages.
U.S. Office Action dated Mar. 4, 2022 pertaining to U.S. Appl. No. 16/449,921, filed Jun. 24, 2019, 21 pages.
International Search Report and Written Opinion dated Sep. 25, 2020 pertaining to International application No. PCT/US2020038396 filed Jun. 18, 2020, 14 pgs.

* cited by examiner

DRILLING FLUIDS THAT INCLUDE WATER-SOLUBLE ACID CATALYST PRECURSORS OR REACTION PRODUCTS OF SUCH AND USES FOR SUCH DRILLING FLUIDS

BACKGROUND

Field

The present disclosure relates to wellbore drilling technology and, more specifically, to drilling fluids utilized in wellbore drilling.

Background

Drilling operations to, for example, drill wellbores for hydrocarbon extraction may include the practice of continuously circulating a drilling fluid (sometimes referred to as a drilling mud) through the formed wellbore during the drilling operation. The drilling fluid may be pumped into the drill pipe and to the bottom of the borehole where the drilling fluid then flows upwardly through an annular space between the wellbore wall and the drill pipe, and finally returns to the surface and flows out of the wellbore where it is recovered for secondary processing. During drilling, the drilling solids, such as portions of the drilled geological formation, may be carried by the drilling fluid from at or near the bottom of the wellbore to the surface. When the drill head encounters an area of reduced formation pressure, such as a fracture, drilling fluid can leak out of the wellbore in what is known as a "lost circulation zone." The consequences of encountering a lost circulation zone can range from drilling fluid leaks to drill head and drill string damage. Lost circulation zones may even lead to blowouts and loss of life. Remediation of a lost circulation zone generally requires the introduction of a sealing composition into the wellbore. However, this process is resource-intensive and time consuming.

BRIEF SUMMARY

Faster and more efficient lost circulation zone remediation techniques are desired. It has been discovered that drilling fluids may be fabricated which can be pumped in a liquid state and converted to a gel as desired. The drilling fluid, in gel form, may then be suitable to seal the porous areas, cracks, fractures, or other geological features which cause the lost circulation zone. According to one or more embodiments presently described, a drilling fluid which is gellable may include a base fluid and a formaldehyde-based resin. The introduction of a water-soluble acid catalyst precursor to the drilling fluid may initiate the conversion of the water-soluble acid catalyst precursor into a water-soluble acid catalyst. The formed water-soluble acid catalyst may initiate conversion of the drilling fluid from a liquid state to a gelled state. For example, the water-soluble acid catalyst may polymerize at least a portion of the formaldehyde-based resins present in the drilling fluid, which may cause the drilling fluid to become a gelled state material. Furthermore, it should be understood that while such drilling fluids may be suitable for use in loss-circulation zones, these drilling fluids may find applicability for other uses such as when controlled gelling of a drilling fluid is desired.

In accordance with one or more embodiments of the present disclosure, a drilling fluid may include a base fluid and one or more formaldehyde-based resins. The drilling fluid may further comprise one or more water-soluble acid catalyst precursors or the reaction products of such water-soluble acid catalyst precursors. The base fluid may include an aqueous or non-aqueous solution. The weight ratio of the one or more formaldehyde-based resins to the base fluid may be from 1:100 to 50:100. The drilling fluid may optionally include polyvinyl alcohol or vinyl alcohol copolymers, where if the polyvinyl alcohol or vinyl alcohol copolymers are present in the drilling fluid, the weight ratio of the sum of the polyvinyl alcohol or vinyl alcohol copolymers to the total weight of the drilling fluid may be less than or equal to 1.5:100. The weight ratio of the sum of the one or more water-soluble acid catalyst precursors and the reaction products of such water-soluble acid catalyst precursors to the total weight of the drilling fluid may be from 0.5:100 to 20:100.

In accordance with one or more embodiments of the present disclosure, a sealed subterranean petroleum formation may include a subterranean wellbore positioned adjacent a subterranean petroleum formation and a drilling fluid positioned in the subterranean wellbore. The drilling fluid may include a base fluid, one or more formaldehyde-based resins, and optionally polyvinyl alcohol or vinyl alcohol copolymers. The drilling fluid may further include one or more water-soluble acid catalyst precursors or the reaction products of such water-soluble acid catalyst precursors. The base fluid may include an aqueous or non-aqueous solution. The weight ratio of the one or more formaldehyde-based resins to the base fluid may be from 1:100 to 50:100. If the polyvinyl alcohol or vinyl alcohol copolymers are present in the drilling fluid, the weight ratio of the sum of the polyvinyl alcohol or vinyl alcohol copolymers to the total weight of the drilling fluid may be less than or equal to 1.5:100. The weight ratio of the sum of the one or more water-soluble acid catalyst precursors and the reaction products of such water-soluble acid catalyst precursors to the total weight of the drilling fluid may be from 0.5:100 to 20:100.

In accordance with yet more embodiments of the present disclosure, a method for sealing a subterranean wellbore may include introducing a drilling fluid into a subterranean wellbore and introducing one or more water-soluble acid catalyst precursors to the drilling fluid. The water-soluble acid catalyst precursor may form a water-soluble acid in the drilling fluid in an amount operable to transition the drilling fluid from a liquid state to a gelled state. The subterranean wellbore may be positioned adjacent to a subterranean petroleum formation. The drilling fluid may include a base fluid, one or more formaldehyde-based resins, and optionally polyvinyl alcohol or vinyl alcohol copolymers. The base fluid may include an aqueous or non-aqueous solution. The weight ratio of the one or more formaldehyde-based resins to the base fluid may be from 1:100 to 50:100. If the polyvinyl alcohol or vinyl alcohol copolymers are present in the drilling fluid, the weight ratio of the sum of the polyvinyl alcohol or vinyl alcohol copolymers to the total weight of the drilling fluid may be less than or equal to 1.5:100.

ABBREVIATIONS

One or more abbreviations are used in the present application, in which:
ASTM=American Society for Testing and Materials;
API=American Petroleum Institute;
$C_x$=carbon chain of x length;
cP=centipoises;
° F.=degrees Fahrenheit;
g=grams;

lb/100 ft² = pounds per 100 square feet;
min. = minutes;
ml = milliliters;
Pa = Pascals;
PAC L = polyanionic cellulose polymer;
PCF = pounds per cubic foot;
psi = pounds per square inch;
rpm = revolutions per minute;
sec. = seconds;
SOBM = synthetic oil based mud; and
wt. % = weight percent.

DETAILED DESCRIPTION

The present disclosure is directed to drilling fluids which may be suitable for use in sealing wells. The present disclosure is further directed to the fabrication of such drilling fluids, as well as the uses of such. According to one or more embodiments of the present disclosure, a drilling fluid is provided that may include a base fluid and one or more formaldehyde-based resins. The drilling fluid may further include one or more gel initiator additives such as water-soluble acid catalyst precursors or the reaction products of such.

In one or more embodiments, the base fluid may comprise an aqueous solution. For example, the aqueous solution may include one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the base fluid may comprise at least 80 wt. %, at least 90 wt. %, at least 95 wt. %, at least 99 wt. %, or even at least 99.9 wt. % of water.

According to additional embodiments, the base fluid may include a non-aqueous solution. The non-aqueous solution may include one or more crude oils or crude oil derivatives such as gasoline, diesel, kerosene, bunker fuel, jet fuel, naptha, or any fraction of a crude oil. For example, in some embodiments non-aqueous drilling fluids may be referred to as synthetic oil based muds (also referred to in the present disclosure as oil-based muds and SOBMs). Synthetic oil-based muds may include crude oil derivatives that have been chemically treated, altered, or refined to enhance certain chemical or physical properties. In comparison, partially-refined crude oil, which may contain several classes (for example, alkane, aromatic, sulfur-bearing, nitrogen-bearing) of thousands of individual compounds, a SOBM may comprise one class with only tens of individual compounds (for example, ester compounds in a $C_{8-14}$ range). Examples of materials used as base fluids for SOBMs include linear alpha olefins, isomerized olefins, poly alpha olefins, linear alkyl benzenes, and vegetable and hydrocarbon-derived ester compounds. In one or more embodiments, the base fluid may comprise at least 80 wt. %, at least 90 wt. %, at least 95 wt. %, at least 99 wt. %, or even at least 99.9 wt. % of a non-water material such as an oil.

According to some additional embodiments of the present disclosure, the drilling fluid may be characterized as an emulsion. The emulsion may be a mixture of the aqueous and non-aqueous base fluids or it may be a mixture of the base fluid and a natural fluid such as water ingress into the fluid. The drilling fluid emulsion may include a surfactant. In such embodiments, the base fluid may comprise water and a non-water component such as an oil. In one or more embodiments, the base fluid may comprise at least 80 wt. %, at least 90 wt. %, at least 95 wt. %, at least 99 wt. %, or even at least 99.9 wt. % of the combination of water and a non-water material such as an oil.

According to one or more embodiments of the present disclosure, the formaldehyde-based resin may be any resin which includes formaldehyde. For example, the formaldehyde-based resin may be one or more of a melamine-formaldehyde resin, a urea-formaldehyde resin, or a phenol-formaldehyde resin. A urea-formaldehyde resin should be understood to include any products of the reaction of urea and formaldehyde. A phenol-formaldehyde resin should be understood to include any products of the reaction of a phenol or substituted phenol with formaldehyde. A melamine-formaldehyde resin should be understood to include any products of the condensation of formaldehyde and melamine. Suitable commercially available melamine-formaldehyde resins, without limitation, may include MEL-FORES 101P (commercially available from Chemanol). Suitable formaldehyde based resins may be distributed as powders, liquids, or dispersions. Suitable formaldehyde-based resins may be formed in-situ in the drilling fluid by the reaction of melamine, phenol, or urea with formaldehyde.

The weight ratio of the one or more formaldehyde-based resins to the base fluid may be from 1:100 to 50:100. For example, the weight ratio of the one or more formaldehyde resins to the base fluid may be from 0.1:100 to 5:100, from 5:100 to 10:100, from 10:100 to 15:100, from 15:100 to 20:100, from 20:100 to 25:100, or from 25:100 to 30:100, from 30:100 to 35:100, from 35:100 to 40:100, from 40:100 to 45:100, from 45:100 to 50:100, or any combination of these. It should be understood that the sum of the any one or more presently disclosed formaldehyde based resins may be present in a weight ratio with respect to the base fluid in any of the disclosed ranges. For example, a single formaldehyde-based resin may be in one of the disclosed weight ratios with respect to the base fluid, or the sum of a combination of disclosed formaldehyde-based resins may be in one of the disclosed weight ratios with respect to the base fluid.

The drilling fluid may become gelled when contacted by the reaction products of the one or more gel initiator additives. The one or more gel initiator additives may include one or more water-soluble acid catalyst precursors. As used in this disclosure, a "water-soluble acid catalyst precursor" may refer to any compound which is water-soluble and is capable of reacting to form an acid catalyst following its incorporation into the drilling fluid. As used in this disclosure, the "reaction products" of the water-soluble acid catalyst precursor may refer to this formed acid catalyst. As presently described, the reaction products are formed from the acid catalyst precursor in the drilling fluid (that is, not in advance of the acid catalyst precursor being mixed with the other components of the drilling fluid). Without being limited by theory, the formed acid catalyst is believed to be operable to initiate polymerization of the formaldehyde-based resin. It is believed that the water-soluble acid catalyst precursor is not directly operable to initiate polymerization of the formaldehyde-based resin and that the water-soluble acid catalyst precursor must first form the water-soluble acid catalyst before initiating polymerization of the formaldehyde-based resin.

According to some embodiments, the one or more water-soluble acid catalyst precursors may undergo a hydrolysis reaction with water to form an acid catalyst, such as a carboxylic acid. For example, the one or more water-soluble acid catalyst precursors may be ethyl lactate. Ethyl lactate is known to undergo a hydrolysis reaction to form lactic acid, as is shown in Reaction 1.

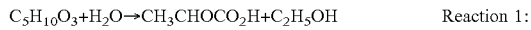
Reaction 1:

According to one or more embodiments, it is believed to be advantageous to use a water-soluble acid catalyst precursor, as opposed to a material that is not water-soluble or an acid catalyst precursor, due at least to their ability to form an acid catalyst in-situ and thereby enable polymerization of the formaldehyde-based resin in a delayed or controllable manner. For example, in some circumstances, introduction of a water-soluble acid catalyst (that is, not a catalyst precursor) may result in overly rapid polymerization. Water solubility may be advantageous because it may allow for more uniform dispersion of the acid catalyst precursor throughout at least the aqueous phase portions of the drilling fluid.

According to some embodiments of the present disclosure, the water-soluble acid catalyst precursor may include a water-soluble hydrolysable ester. In some embodiments, the water-soluble hydrolysable ester may include one or more of ethyl lactate, diethylene glycol di-formate, ethyl acetate, ethyl formate, ethylene glycol diacetate, or diethylene glycol di-lactate. The water-soluble hydrolysable ester may include ethyl lactate. In one or more embodiments, at least 80 wt. %, at least 90 wt. %, at least 95 wt. %, at least 99 wt. %, or even at least 99.9 wt. % of the water-soluble acid catalyst precursor may include water-soluble hydrolysable ester.

The water-soluble hydrolysable ester or the reaction products of such may be present in an amount such that the weight ratio of the sum of the one or more water-soluble acid catalyst precursors and the reaction products of such to the total weight of the drilling fluid is from 0.1:100 to 20:100. For example, the weight ratio of the sum of the one or more water-soluble acid catalyst precursors and the reaction products of such to the total drilling fluid may be from 0.1:100 to 0.5:100, or from 0.5:100 to 2:100, or from 2:100 to 5:100, or from 5:100 to 10:100, or from 10:100 to 15:100, or from 15:100 to 20:100, or any combination of these.

The water-soluble acid catalyst precursor and the reaction products of such may be present in an amount such that the pH of the drilling fluid, at a hydrolysis benchmark time after initial contacting of the water-soluble acid catalyst precursor with the base fluid, is less than or equal to 6, less than or equal to 5, less than or equal to 4, less than or equal to 3, less than or equal to 2. The hydrolysis benchmark time may be from 0.5 hours (hr) to 24 hr, for example, the hydrolysis benchmark time may be 0.5 hr, 1 hr, 2 hr, 4 hr, 8 hr, 12 hr, 16 hr, 20 hr, 24 hr, from 0.5 hr to 1 hr, from 1 hr to 2 hr, from 2 hr to 4 hr, from 4 hr to 6 hr, from 6 hr to 8 hr, from 8 hr to 10 hr, from 10 hr to 12 hr, from 12 hr to 16 hr, from 16 hr to 20 hr, from 20 hr to 24 hr, or any combination of these. Without being limited by theory, it is believed that the water-soluble acid catalyst precursor is not acidic and may not make the drilling fluid acidic immediately.

According to some embodiments of the present disclosure, the drilling fluid may include one or more weighting agents. The weighting agent may include, for example, one or more of barite, hematite, calcium carbonate, siderite, or limenite. The weight ratio of the one or more weighting agents to the base fluid may be from 10:100 to 300:100, from 1:100 to 10:100, from 10:100 to 25:100, from 25:100 to 50:100, from 50:100 to 100:100, from 100:100 to 150:100, from 150:100 to 200:100, from 200:100 to 250:100, from 250:100 to 300:100, from 300:100 to 350:100, from 350:100 to 400:100, from 400:100 to 450:100, from 450:100 to 500:100, or any combination of these.

According to some embodiments of the present disclosure, the drilling fluid may include a rheology modifier. The rheology modifier may include, for example, one or more of bentonite, montmorillonite, sodium carbonate, polymers, carboxymethylcellulose (CMC), starch, or phosphorylates. The polymer may include one or both of guar gum (sometimes called XC-Polymer) or polyanionic cellulose polymer (such as PAC L, commercially from Halliburton). The weight ratio of the rheology modifier to the base fluid may be from 0.001:100 to 10:100. For example, the weight ratio may be from 0.001:100 to 0.005:100, from 0.005:100 to 0.01:100, from 0.01:100 to 0.5:100, from 0.5:100 to 1:100, from 0.5:100 to 1:100, from 1:100 to 2:100, from 2:100 to 3:100, from 3:100 to 4:100, from 4:100 to 5:100, from 5:100 to 6:100, from 6:100 to 7:100, from 8:100 to 9:100, from 9:100 to 10:100, any combination of these. The concentration of the rheology modifier in the drilling fluid may be from 0.1 pounds per barrel (ppb) to 20 ppb. For example, the concentration may be from 0.1 ppb to 0.5 ppb, from 0.5 ppb to 1 ppb, from 1 ppb to 1.5 ppb, from 1.5 ppb to 2 ppb, from 2.5 ppb to 3 ppb, from 3 ppb to 4 ppb, from 4 ppb to 5 ppb, from 5 ppb to 6 ppb, from 6 ppb to 7 ppb, from 7 ppb to 8 ppb, from 8 ppb to 9 ppb, from 9 ppb to 10 ppb, from 10 ppb to 11 ppb, from 11 ppb to 12 ppb, from 12 ppb to 13 ppb, from 13 ppb to 14 ppb, from 14 ppb to 15 ppb, from 15 ppb to 16 ppb, from 16 ppb to 17 ppb, from 17 ppb to 18 ppb, from 18 ppb to 19 ppb, from 19 ppb to 20 ppb, or any combination of these.

According to some embodiments of the present disclosure, the drilling fluid may include a basic additive. The basic additive may include one or both of sodium hydroxide or potassium hydroxide. Without being limited by theory, it is believed that in some embodiments the formaldehyde-based resin may not cause the drilling fluid to gel at pH values greater than 6. It may be beneficial to keep the pH of the drilling fluid as basic as possible until it is desired for the drilling fluid to gel.

In one or more embodiments, a standard drilling fluid may be converted to an embodiment of the drilling fluid of this disclosure as a leak is detected by addition of the acid precursor, causing subsequent gelling. The standard drilling fluid may have any characteristics expected of a drilling fluid such as a basic pH.

The weight ratio of the basic additive to the base fluid may be from 0.001:100 to 5:100. For example, the weight ratio may be from 0.001:100 to 0.005:100, from 0.005:100 to 0.01:100, from 0.01:100 to 0.5:100, from 0.5:100 to 1:100, from 0.5:100 to 1:100, from 1:100 to 2:100, from 2:100 to 3:100, from 3:100 to 4:100, from 4:100 to 5:100, or any combination of these. The concentration of the basic additive in the drilling fluid may be from 0.1 pounds per barrel (ppb) to 10 ppb. For example, the concentration may be from 0.1 ppb to 0.5 ppb, from 0.5 ppb to 1 ppb, from 1 ppb to 1.5 ppb, from 1.5 ppb to 2 ppb, from 2.5 ppb to 3 ppb, from 3 ppb to 4 ppb, from 4 ppb to 5 ppb, from 5 ppb to 6 ppb, from 6 ppb to 7 ppb, from 7 ppb to 8 ppb, from 8 ppb to 9 ppb, from 9 ppb to 10 ppb, or any combination of these.

According to some embodiments of the present disclosure, the drilling fluid may include cement. Generally, cements may be added to increase strength but may have several disadvantages as compared with drilling fluids which contain little or no cement. Cements may have relatively long cure times and may require the operator to re-drill through the cured cement. The ratio of cement to drilling fluid may be from 0.1:100 to 0.5:100, from 0.5:100 to 1:100, from 1:100 to 2:100, from 2:100 to 4:100, from 4:100 to 8:100, from 8:100 to 12:100, from 12:100 to 15:100, from 15:100 to 25:100, from 25:100 to 50:100, from 50:100 to 75:100, from 75:100 to 100:100, from 100:100 to 150:100, from 150:100 to 200:100, or any combination of these.

According to some embodiments of the present disclosure, the drilling fluid may not include latex, or latex may be included in only relatively small amounts in the drilling fluid. If latex is present in the drilling fluid, the weight ratio of the latex to the total weight of the drilling fluid may be from 0:100 to 10:100, from 0:100 to 8:100, from 0:100 to 6:100, from 0:100 to 4:100, from 0:100 to 2:100, from 0:100 to 1:100, or even from 0:100 to 0.1:100. According to some embodiments, latex may not be present in the drilling fluid. As used in this disclosure, "latex" may refer to rubber materials commercially available in aqueous latex form, such as aqueous dispersions or emulsions. These include natural rubbers such as (cis-1,4-polyisoprene), modified types of these, synthetic polymers, or combinations of these. The synthetic polymers may include styrene/butadiene rubber, cis-1,4-polybutadiene, high styrene resin, butyl rubber, ethylene/propylene rubber, neoprene rubber, nitrile rubber, cis-1,4-polyisoprenerubber, silicone rubber, chlorosulfonated rubber, polyethylene rubber, epichlorohydrin rubber, fluorocarbon rubber, fluoro silicone rubber, polyurethane rubber, polyacrylic rubber, or polysulfide rubber. It is believed to be advantageous to use a minimal amount of latex at least for cost savings. It should be understood that while some conventional drilling fluids may require latex as an additive, the presently disclosed drilling fluids may not require latex for their desired functionality. The formaldehyde-based resin and gel initiator additive of the presently disclosed drilling fluids may provide suitable gelling characteristics in the absence of latex, or with relatively small amounts of latex included.

According to some additional embodiments of the present disclosure, the drilling fluid may not include polyvinyl alcohol and vinyl alcohol copolymers, or polyvinyl alcohol and vinyl alcohol copolymers may be included in only relatively small amounts in the drilling fluid. If the polyvinyl alcohol or vinyl alcohol copolymers are present in the drilling fluid, the weight ratio of the polyvinyl alcohol or vinyl alcohol copolymers to the total weight of the drilling fluid may be from 0:100 to 1.5:100, from 0:100 to 1:100, from 0:100 to 0.5:100, or even from 0:100 to 0.1:100. In additional embodiments, the weight ratio of the combination of polyvinyl alcohol and vinyl alcohol copolymers to the total weight of the drilling fluid may be from 0:100 to 1.5:100, from 0:100 to 1:100, from 0:100 to 0.5:100, or even from 0:100 to 0.1:100. It is believed to be advantageous to use a minimal amount of polyvinyl alcohol and vinyl alcohol copolymers at least for cost savings. It should be understood that while some conventional drilling fluids may require polyvinyl alcohol or vinyl alcohol copolymers as an additive, the presently disclosed drilling fluids may not require polyvinyl alcohol or vinyl alcohol copolymers for their desired functionality. The formaldehyde-based resin and gel initiator additive of the presently disclosed drilling fluids may provide suitable gelling characteristics in the absence of polyvinyl alcohol and vinyl alcohol copolymers, or with relatively small amounts of polyvinyl alcohol and vinyl alcohol copolymers included.

According to some embodiments of the present disclosure, the drilling fluid may be present in a gelled state, such as after it contains the reaction products of the presently disclosed gel initiator additive. The reaction of the gel initiator additive may reduce the pH of the drilling fluid, which may cause gelation. The drilling fluid may be gelled or exist in a "gelled state" by meeting the criteria that the apparent viscosity at 300 rpm and 25° C. is greater than 50,000 cP. For example, conventional drilling fluids, or the disclosed drilling fluids prior to the described reducing of pH, may have an apparent viscosity at 300 rpm and 25° C. of less than 500 cP, such as from 10 to 250 cP. Gelled state drilling fluids, as presently described, may have an apparent viscosity at 300 rpm and 25° C. of at least 50,000 cP, such as at least 100,000 cP, or even at least 150,000 cP. Apparent viscosity may be measured according to API "RP 13B-1: Recommended Practice for Field Testing Water-based Drilling Fluids."

According to some embodiments of the present disclosure, the drilling fluid may have (following introduction of the gel initiator additive) a storage modulus of at least 50 Pa. For example, the drilling fluid may have (following introduction of the gel initiator additive) a storage modulus of at least 100 Pa, at least 150 Pa, at least 200 Pa, at least 250 Pa, at least 300 Pa, at least 400 Pa, at least 500 Pa, from 1 Pa to 10 Pa, from 10 Pa to 25 Pa, from 25 Pa to 50 Pa, from 50 Pa to 75 Pa, from 75 Pa to 100 Pa, from 100 Pa to 150 Pa, from 150 Pa to 200 Pa, from 200 Pa to 300 Pa, from 300 Pa to 400 Pa, from 400 Pa to 500 Pa, from 500 Pa to 600 Pa, from 600 Pa to 800 Pa, from 800 Pa to 1000 Pa, or any combination of these. The storage modulus may be measured according to ASTM "D5026-15, Standard Test Method for Plastics: Dynamic Mechanical Properties: In Tension."

According to some embodiments of the present disclosure, the drilling fluid (after it contains the reaction products of the presently disclosed gel initiator additive) may have a 10 min. gel strength of at least 10 lb/100 ft$^2$. For example, the gel strength of the drilling fluid may be at least 15 lb/100ft$^2$, at least 20 lb/100ft$^2$, at least 40 lb/100ft$^2$, at least 80 lb/100ft$^2$, at least 120 lb/100 ft$^2$, at least 160 lb/100 ft$^2$, at least 200 lb/100 ft$^2$, or any combination of these. The gel strength may be measured by the method API RP 13B-1: Recommended Practice for Field Testing Water-based Drilling Fluids.

According to one or more embodiments of the present disclosure, the drilling fluid may have a density of from 50 PCF to 160 PCF. For example, the density of the drilling fluid may be from 50 PCF to 80 PCF, from 80 PCF to 120 PCF, from 120 PCF to 160 PCF, or any combination of these. Drilling fluid density may be important to maintain the appropriate hydrostatic pressure in the wellbore. Inappropriate density drilling fluid can cause the flow of formation fluids into the wellbore during drilling operations (such as kicks or blowouts). It should be understood that the density of the drilling fluid is not expected to change as it transitions from a liquid to a gelled state.

In one or more embodiments, the presently disclosed drilling fluids may be positioned in a wellbore during drilling of the wellbore. According to some embodiments of the present disclosure, a sealed subterranean petroleum formation may include a subterranean wellbore positioned adjacent a subterranean petroleum formation and a drilling fluid positioned in the subterranean wellbore. The sealed subterranean petroleum formation may not be completely sealed but may have its leakage rate decreased relative to what it would be in the absence of the drilling fluids of the present disclosure.

According to some embodiments of the present disclosure, a method for sealing a well may include introducing a drilling fluid into a subterranean wellbore positioned adjacent to a subterranean petroleum formation and introducing to the drilling fluid one or more gel initiator additives in an amount operable to reduce the pH of at least a portion of the drilling fluid to less than or equal to 6 to transition the drilling fluid from a liquid to a gelled state. For example, the pH may be reduced to a pH range of from 0 to 1, from 1 to 2, from 2 to 3, from 3 to 4, from 4 to 5, from 5 to 6, or any combination of these. It should be understood that in some embodiments, the drilling fluid may be fabricated by adding the various components in different orders. For example, the acid may be added to the base fluid before the formaldehyde-based resin is added to the base fluid to constitute the drilling fluid.

According to some embodiments, the pH of the drilling fluid before the addition of the gel initiator additive may be alkaline, such as in a range of from 8 to 12. For example, the pH of the drilling fluid before the addition of the gel initiator additive may be from 8 to 9, from 9 to 10, from 10 to 11, from 11 to 12, or any combination of these. Without being limited by theory, it is believed that a starting pH of greater than 8 will enable normal drilling fluid operation and prevent premature gelling of the drilling fluid.

In one or more embodiments, the one or more gel initiator additives may be introduced to the drilling fluid inside of the subterranean wellbore. For example, a drilling fluid including the base fluid and formaldehyde-based resin may be inside the subterranean wellbore and the gel initiator additive may be subsequently pumped down into the wellbore. The gel initiator additive may be pumped near a site of a suspected leak, casing fracture, or site otherwise requiring sealing. Alternatively, the gel initiator additive may be pumped generally into the drilling fluid in the wellbore and cause the bulk drilling fluid to gel. In further embodiments, the one or more gel initiator additives may be introduced to the drilling fluid outside of the subterranean wellbore. Introducing the gel initiator additives to the drilling fluid outside the subterranean wellbore may be more convenient. The drilling fluid including the gel initiator additive may then be pumped back down into the subterranean wellbore before it has gelled.

EXAMPLES

Using the embodiments of the present disclosure, drilling fluid additives were produced which exemplify the catalytic attributes presently described. It should be understood that the ensuing Examples are illustrative of one or more embodiments presently disclosed, and should not be construed as in any way as limiting on the appended claims or other portions of the present application.

Example 1

A conventional 90 PCF aqueous drilling fluid was produced by combining bentonite and water, and the mixture was allowed to sit for 4 hours. The water and bentonite were then mixed for twenty minutes. Then, in order, XC Polymer, PAC L, starch, NaOH, and barite were each added individually with five minutes of mixing after each addition. The concentrations given in Table 1 are for the final drilling fluid.

TABLE 1

| Additive | wt. % |
| --- | --- |
| Water | 58.84 |
| Bentonite | 0.59 |
| XC polymer | 0.30 |

TABLE 1-continued

| Additive | wt. % |
| --- | --- |
| PAC L | 0.39 |
| Starch | 0.79 |
| NaOH | 0.01 |
| Barite | 38.98 |

The resultant conventional drilling fluid was then hot rolled for 16 hours at 200° F. in an aging cell. After hot rolling, the conventional drilling fluid was allowed to cool and was then transferred to a mud cup. The conventional drilling fluid was subsequently subjected to a variety of standard rheological and filtration property tests at 120° F. The rheological and filtration properties are shown in Table 2.

TABLE 2

| Measurement | Value |
| --- | --- |
| 600 rpm | 80 lb/100 ft$^2$ |
| 300 rpm | 53 lb/100 ft$^2$ |
| 200 rpm | 41 lb/100 ft$^2$ |
| 100 rpm | 28 lb/100 ft$^2$ |
| 6 rpm | 4 lb/100 ft$^2$ |
| 3 rpm | 3 lb/100 ft$^2$ |
| Plastic viscosity | 27 cP |
| Yield point | 26 lb/100 ft$^2$ |
| 10 sec. Gel Strength | 3 lb/100 ft$^2$ |
| 10 min. Gel Strength | 5 lb/100 ft$^2$ |
| pH | 10.3 |
| API fluid loss, 30 min. | 4 ml |

As can be seen in from the data of Table 2, the conventional drilling fluid did not form a gel.

Example 2

To form a drilling fluid of some embodiments of the present disclosure, 350 ml of the conventional drilling fluid of example 1 was mixed with 50 g of powdered melamine formaldehyde resin (commercially available as MELFORES 101 P) for 5 minutes. Then, 5 g of ethyl lactate was added and the solution was mixed for another 5 minutes.

The resultant gellable drilling fluid was then static aged in a curing chamber at 200° F. and 1000 psi for 16 hours. After removal from the curing chamber, it was observed that the gellable drilling fluid had formed a gelled solid. The gelled solid maintained a cylindrical shape with no external support. It had well defined corners and no observable sagging along the vertical walls.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

It is noted that one or more of the following claims utilize the term "where" as a transitional phrase. For the purposes of defining the present subject matter, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A drilling fluid consisting of:
a base fluid comprising an aqueous or non-aqueous solution;
one or more formaldehyde-based resins, wherein the weight ratio of the one or more formaldehyde-based resins to the base fluid is from 10:100 to 20:100;
optionally polyvinyl alcohol or vinyl alcohol copolymers, wherein if the polyvinyl alcohol or vinyl alcohol copolymers are present in the drilling fluid, the weight ratio of the sum of the polyvinyl alcohol or vinyl alcohol copolymers to the total weight of the drilling fluid is less than or equal to 1.5:100;
one or more water-soluble acid catalyst precursors, wherein the weight ratio of the sum of the one or more water-soluble acid catalyst precursors to the total weight of the drilling fluid is from 0.5:100 to 2:100;
a rheology modifier; a basic additive comprising sodium hydroxide; and
one or more weighting agents, wherein the weight ratio of the one or more weighting agents to the base fluid is from 10:100 to 100:100;
wherein:
the drilling fluid is in a gelled state such that the apparent viscosity at 300 rpm and 25° C. of the drilling fluid is greater than or equal to 50,000 centiPoise;
the drilling fluid has a density of from 50 pounds per cubic foot to 160 pounds per cubic foot;
the one or more formaldehyde based resins comprises melamine-formaldehyde resin;
the one or more water-soluble acid catalyst precursors comprises ethyl lactate;
the weight ratio of the basic additive to the base fluid is from 0.001:100 to 5:100;
the one or more weighting agents comprises barite.

2. The drilling fluid of claim 1, wherein the base fluid comprises an aqueous solution.

3. The drilling fluid of claim 1, wherein the base fluid comprises a non-aqueous solution.

4. The drilling fluid of claim 1, wherein:
the one or more formaldehyde based resins consists of melamine-formaldehyde resin; and
the one or more water-soluble acid catalyst precursors consists of ethyl lactate.

5. The drilling fluid of claim 1, wherein:
the base fluid consists of water;
the one or more formaldehyde based resins consists of melamine-formaldehyde resin;
the one or more water-soluble acid catalyst precursors consists of ethyl lactate;
the basic additive consists of sodium hydroxide;
the one or more weighting agents consists of barite; and
the rheology modifier consists of bentonite, guar gum, polyanionic cellulose polymer, and starch.

6. The drilling fluid of claim 1, wherein the rheology modifier comprises one or more of bentonite, guar gum, polyanionic cellulose polymer, or starch.

7. The drilling fluid of claim 1, wherein the rheology modifier comprises bentonite, guar gum, polyanionic cellulose polymer, and starch.

8. A sealed subterranean petroleum formation comprising:
a subterranean wellbore positioned adjacent a subterranean petroleum formation; and
a drilling fluid positioned in the subterranean wellbore, the drilling fluid consisting of:
a base fluid comprising an aqueous or non-aqueous solution;
one or more formaldehyde-based resins, wherein the weight ratio of the one or more formaldehyde-based resins to the base fluid is from 10:100 to 20:100;
optionally polyvinyl alcohol or vinyl alcohol copolymers, wherein if the polyvinyl alcohol or vinyl alcohol copolymers are present in the drilling fluid, the weight ratio of the sum of the polyvinyl alcohol or vinyl alcohol copolymers to the total weight of the drilling fluid is less than or equal to 1.5:100;
one or more water-soluble acid catalyst precursors, wherein the weight ratio of the sum of the one or more water-soluble acid catalyst precursors to the total weight of the drilling fluid is from 0.5:100 to 2:100;
a rheology modifier; a basic additive comprising sodium hydroxide; and
one or more weighting agents, wherein the weight ratio of the one or more weighting agents to the base fluid is from 10:100 to 100:100;
wherein:
the drilling fluid is in a gelled state such that the apparent viscosity at 300 rpm and 25° C. of the drilling fluid is greater than or equal to 50,000 centiPoise;
the drilling fluid has a density of from 50 pounds per cubic foot to 160 pounds per cubic foot;
the one or more formaldehyde based resins comprises melamine-formaldehyde resin;
the one or more water-soluble acid catalyst precursors comprises ethyl lactate;
the weight ratio of the basic additive to the base fluid is from 0.001:100 to 5:100;
the one or more weighting agents comprises barite.

9. The drilling fluid of claim 8, wherein the rheology modifier comprises one or more of bentonite, guar gum, polyanionic cellulose polymer, or starch.

10. The drilling fluid of claim 8, wherein the rheology modifier comprises bentonite, guar gum, polyanionic cellulose polymer, and starch.

* * * * *